United States Patent [19]

McGrew

[11] 3,820,162

[45] June 28, 1974

[54] CONSTANT PRESSURE MATERIAL

[76] Inventor: Stephen Paul McGrew, 4624 W. 34th St., Spokane, Wash. 99204

[22] Filed: Jan. 5, 1971

[21] Appl. No.: 104,056

[52] U.S. Cl. .................. 2/2.1 A, 161/161, 128/156, 128/580, 206/46 R, 206/DIG. 34

[51] Int. Cl. .................. A62b 17/00

[58] Field of Search .................. 2/2, 2.1 R, 2.1 A; 161/161, 159; 264/321; 260/2.5 R, 2.5 AF; 128/156, 580; 206/46 R, DIG. 34

[56] References Cited

UNITED STATES PATENTS

| | | | |
|---|---|---|---|
| 3,032,772 | 5/1962 | Fonash | 2/2.1 A |
| 3,091,551 | 5/1963 | Robertson | 260/2.5 AF |
| 3,392,405 | 7/1968 | Ritzinger et al. | 2/2.1 R |
| 3,428,960 | 2/1969 | Schueller | 2/2.1 R |
| 3,437,722 | 4/1969 | Cronin et al. | 260/2.5 AF |
| 3,524,825 | 8/1970 | Rill | 260/2.5 AF |
| 3,528,414 | 9/1970 | Schueller | 2/2.1 A |
| 3,575,897 | 4/1971 | Port | 260/2.5 R |

*Primary Examiner*—George H. Krizmanich

[57] ABSTRACT

A flexible cellular material is disclosed which has a substance or substances sealed therein capable of maintaining a substantially constant inflation pressure therein regardless of changes in volume, external pressure, or deformation of the cellular material. The material incorporated and sealed in the cellular material is a liquid or solid material which responds to external pressure variations by transformation to the gaseous state until the volume in the cellular material occupied by the gaseous vapors of the material is substantially equal to the equilibrium vapor pressure at a given temperature. The cellular material is preferably multicellular and is useful in pressure suits, pressure bandages, mattresses, cushions, packaging and other applications where a constant, uniform pressure against an object or objects is desired.

10 Claims, 6 Drawing Figures

PATENTED JUN 28 1974 3,820,162
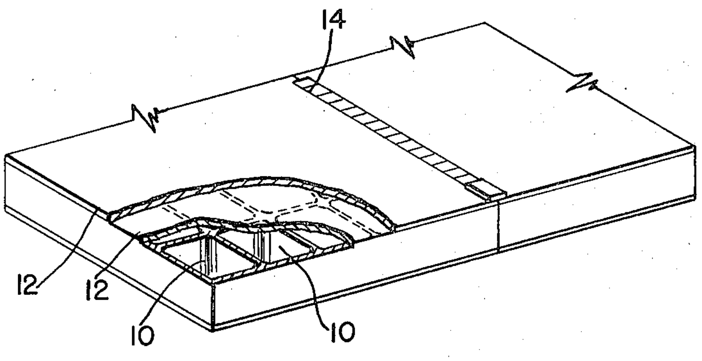
FIG. 1
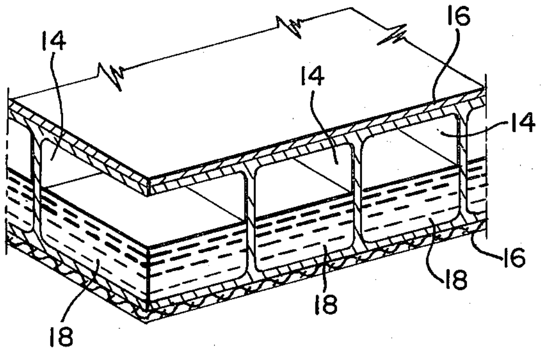
FIG. 2
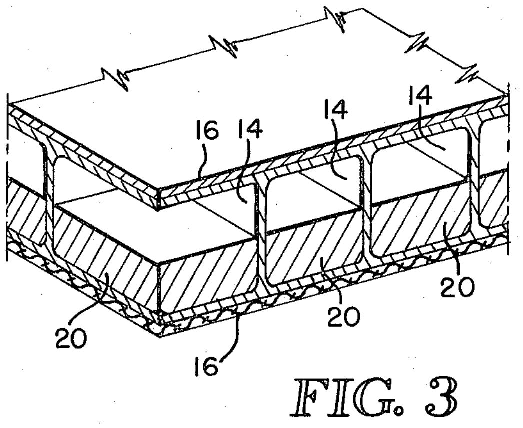
FIG. 3
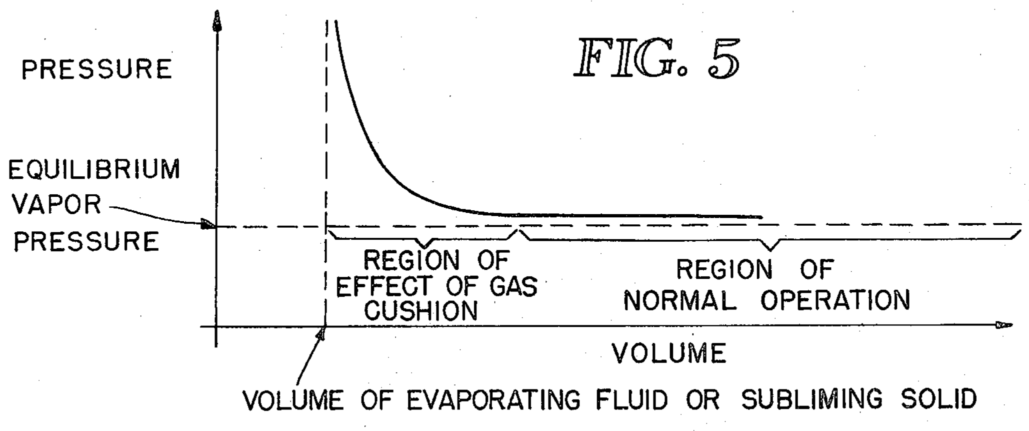
FIG. 5
FIG. 6
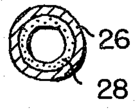
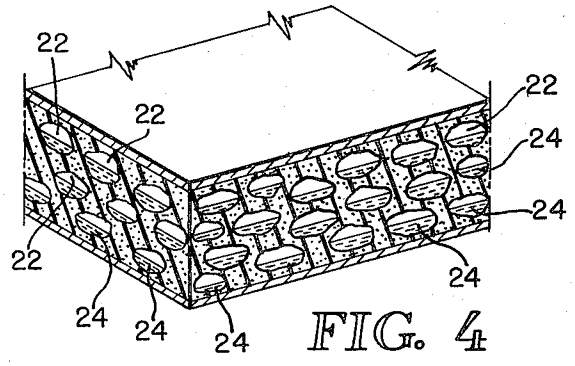
FIG. 4
INVENTOR.
STEPHEN P. MC GREW
BY
Seed, Berry & Dowrey
ATTORNEYS

CONSTANT PRESSURE MATERIAL

BACKGROUND OF THE INVENTION

1. Field of the Invention

This invention relates to a flexible, cellular material capable of exerting a relatively constant uniform pressure against an object or objects regardless of change of external conditions such as a change in external pressure.

2. Prior Art Relating to the Disclosure

Pressure suits used at high altitude or for intravehicular or extra-vehicular use in aerospace missions are designed for comfortable wear at normal altitudes or for wear in space vehicles and satellites under "shirt-sleeve" conditions. Space suits are designed to be pressurized if and when the exterior pressure falls below a predetermined value. Such a suit is disclosed, for example, in U.S. Pat. No. 3,428,960 wherein a multi-cellular material is originally filled with a gas at a predetermined low pressure so that the volume of the cells is reduced by exterior pressure under normal atmospheric pressures. When the exterior pressure is reduced, gas contained in the cells of the multi-cellular material expands to supply the required inward pressure on the body of the wearer. When in the expanded state such pressure suits resist and inhibit body movement of the wearer tending to deform the cellular material. Such resistance and inhibition limit the capability and dexterity of the wearer.

U.S. Pat. No. 3,032,772 discloses a protective garment to be worn by occupants of space vehicles which employs a sublimating material to protect the wearer of the garment against excessive heat.

SUMMARY OF THE INVENTION

This invention relates to a resilient, flexible, cellular material made up of one or more independent cells having sealed therein a liquid or solid material which responds to external pressure variations by evaporation until the vapor pressure of the material in the cellular material is substantially equal to the equilibrium vapor pressure at a given temperature. The pressure within the cellular material remains substantially constant regardless of external pressure changes, volume changes, or deformation of the cellular material.

The principal objects of this invention are:

1. to provide a material for construction of pressure suits, capable of maintaining constant uniform pressure against the body of the wearer without substantial resistance to deformation due to body motion;

2. to provide a material for construction of pressure suits capable of maintaining a constant uniform pressure against the body of the wearer while allowing ventilation of the skin and evaporation of moisture therefrom;

3. to provide a material for construction of pressure suits that are deflated and easy to get into or out of at normal "shirt-sleeve" conditions and which, at or below a preset pressure, will automatically inflate and remain inflated at the preset pressure regardless of volume changes resulting from body motion or other causes, until the external pressure returns to a value above the preset pressure;

4. to provide a material for construction of pressure bandages which will maintain a uniform, constant pressure against the skin without hindering motion of the part of the body which is bandaged;

5. to provide a means of keeping inflatable objects inflated at a predetermined pressure regardless of deformation or punctures;

6. provide a self-inflating material which can be used in the construction of cushions, mattresses, padding and the like capable of maintaining a constant pressure of inflation regardless of deformation; and 7. provide a material useful in packaging applications wherein a constant, uniform pressure against a packaged object is desired.

BRIEF DESCRIPTIONS OF THE DRAWINGS

FIG. 1 is a perspective view of a pressure bandage with parts broken away of the constant pressure material of this invention, including means for fastening the ends of the material together;

FIG. 2 is a cross section view of the constant pressure cellular material with each of the cells containing an evaporating liquid and its vapor, the cells being confined by a flexible, non-extensible material;

FIG. 3 is a cross section view of a portion of a constant pressure material similar to FIG. 2 except that the cells contain a subliming solid rather than an evaporating liquid;

FIG. 4 is a cross section view of a constant pressure foamed material having small cells therein containing a liquid or solid vaporizing substance confined within a flexible porous or absorbent matrix, the matrix covered with a non-extensible, flexible material;

FIG. 5 is a plot of the pressure-volume relationship in a multi-cellular material which contains both a gas and a vaporizing material non-reactive with the gas; and FIG. 6 is a cross section of a cell containing a subliming solid adhered around the inner walls of the cell.

DESCRIPTION OF THE PREFERRED EMBODIMENT

Referring to FIG. 1, the constant-pressure material consists of one or more independent cells 10 formed of a flexible, material such as plastic film. Means for forming such multicellular materials are known. The outer surface of the cellular material may be covered with one or more layers of flexible, non-extensible material such as plastic film or woven fabric 12.

The self-inflating material showed in FIG. 1 is useful and appropriate for pressure bandages and includes means for connecting two ends of the material together. The particular means shown is a zipper 14 although hooks and loop fasteners may be used or other fastening means to hold the ends of the bandage together around the particular area of the body intended for treatment.

In FIGS. 2 and 3, a self-inflating material useful for pressure suits is shown. The material consists of multiple independent cells 14 made of a flexible, non-porous material. The outer surfaces of the cells are lined with a flexible, non-extensible material such as a woven fabric 16 suitable for skin contact. The interior of the cells are filled in FIG. 2 with a liquid substance 18 and its vapor. The cells in FIG. 3 are filled with a solid substance 20 and its vapor.

In FIG. 4 small cells 22 within a flexible matrix contain a vaporizing substance 24, either liquid or solid. The matrix may be foamed material faced with a nonextensible, flexible material, such as plastic film or a woven fabric. Regardless of the application of the material, that is for space suits, pressure bandages, and the like, the material consists of one or more cellular units containing a substance whose vapor pressure is equal to the desired inflation pressure of the cell at a given temperature. The substance may be one of many liquids or solids with suitable vapor pressures. These solids or liquids have vapor pressures responsive to external pressure and temperature variations by evaporation until the vapor pressure of the material in the cell is substantially equal to the equilibrium vapor pressure at a given temperature. It is the nature of such substances to evaporate until the available volume of each cell is occupied with vapor at the equilibrium vapor pressure. If the volume is decreased vapor is transformed back to the solid or liquid phase. On the other hand, if the volume is increased further evaporation takes place to maintain constant equilibrium pressure.

When applied in a pressure suit for work in low or zero exterior pressures, the vaporizing substance in the cells is chosen to have a vapor pressure less than or equal to normal atmospheric or "shirt-sleeve" pressure so that the cells are normally deflated for easy removal of the pressure suit. When the external pressure drops below the vapor pressure of the substance due to decompression of the cabin or space use the individual cells inflate until the equilibrium vapor pressure of the material in the cells is reached. The temperature within a pressure suit is controlled by known means at or near the normal body temperature of the wearer. Preferably, as disclosed in U.S. Pat. No. 3,428,960 the external suit covering is chosen to stretch minimally while the internal lining may be fairly flexible so that, when the cells expand, they will expand inwardly against the skin of the wearer to maintain a constant uniform pressure against the body of the wearer regardless of body motion. It is preferable to provide the cellular material with perforations between the cells so that the cellular material becomes permeable to air and moisture at all times. By employing a flexible, restraining outer garment and a porous inner garment next to the skin of the wearer, the suit is effectively ventilated for removal of air and heat from the wearer at all times. Exemplary of the vaporizing substances which may be sealed in cells for pressure suit use include the following:

| | Indicating Temp. in °C at vapor pressure of 100, 400 and 760 mm Hg. | | |
|---|---|---|---|
| | 100 | 400 | 760 |
| Ammonium carbamate | 26.7 (solid) | 48.0 (solid) | 58.3 (solid) |
| Triborine triamine | 4.0 | 34.3 | 50.6 |
| Tetrahydropentaborene | 20.1 | 51.2 | 67.6 |
| Carbon tetrachloride | 23.0 | 57.8 | 76.7 |
| Chlorine heptoxide | 29.1 | 62.2 | 78.8 |
| Trisilane | 1.6 | 35.5 | 53.1 |
| Ethyl alcohol | 31.0 | 62.0 | 78.3 |

An advantage of the multi-cellular material shown in FIGS. 2 and 3 is that small punctures will not be harmful in pressure suit applications since the cells throughout the suit are independent. Cells adjacent to the puncture will tend to expand and cover the exposed area.

When used as a pressure bandage, the cellular structure shown in FIG. 1 may have an outer absorbent and/or ventilating surface as described in conjunction with and pressure suit. The vaporizing substance chosen to fill each of the cells for pressure bandage applications is chosen to have a vapor pressure greater than atmospheric pressure at a given temperature, generally around the normal body temperature of about 37°C. Under these circumstances the cells will be fully inflated at normal atmospheric pressure. When the bandage is wrapped around the area to be treated, the cells are deformed to match body contours while still maintaining constant uniform pressure against the area of the body wrapped by the bandage. If it is desired to deflate the bandage for storage it may be either refrigerated or compressed in a suitable container.

As an alternative form of the invention a small amount of air or gas non-reactive with the vaporizing substance may be included in the cells along with the vaporizing substance, the cell or cells of the multicellular material filled with the air or gas at or under very low pressure and sealed therein, such as disclosed in U.S. Pat. No. 3,428,960. The gas will fill the cell or cells according to the known gas law $PV = kt$. At full cell expansion, the partial pressure of the gas in the cells will be small while the pressure in the cells will be relatively large near deflation. The pressure-volume relationship for the total system of cell plus gas plus vaporizing substance is as shown in FIG. 5. Referring to FIG. 5, the horizontal dotted line, labelled "Equilibrium Vapor Pressure," remains constant at all times, regardless of volume change. The vertical dotted lines labelled "Volume of Evaporating Fluid or Subliming Solid" represents the volume of fluid or solid in the cell when the substance is totally in the liquid or solid state. The solid line is indicative of the change in pressure of the gas or air filling the cells as the volume of the cell is increased or decreased. By providing the cell or cells with a small amount of gas or air in admixture with a vaporizing substance or substances as disclosed previously, a cushioning effect at low cell volume is obtained which prevents complete cell deflation. This alternate form of the invention is particularly useful in packaging applications where delicate objects require gentle uniform cushioning.

FIG. 6 illustrates a single cell 26 having a coating 28 of subliming solid adhered around the inner surface thereof. Disposing the subliming solid in this manner enables greater exposure of the surface area of the solid with quicker response time to temperature and/or pressure changes. Such individual cells may be used as a filler material in such applications as furniture padding, packaging, etc. in the same manner that shredded foam rubber, feathers or other filler material is used.

The embodiments of the invention in which an exclusive property or privilege is claimed are defined as follows:

1. A resilient, flexible, cellular material made up of one or more independent cells having a vaporizing substance sealed therein, the vaporizing substance occupying less than the maximum inflated volume of the cell and having a vapor pressure equal to a predetermined inflation pressure at a given temperature, the vaporizing substance by phase change from solid or liquid to gas, maintaining the inflation pressure against the cell walls independent of changes in the volume of the cell.

2. The material of claim 1 wherein the cellular material is made up of a multiplicity of individual cells held together by a flexible, substantially non-extensible material, each having an amount of a subliming solid sealed therein coccupying less than the total volume of each cell.

3. The material of claim 1 wherein the cellular material is made up of a multiplicity of individual cells, held together by a flexible, substantially non-extensible material, each having an amount of evaporating liquid sealed therein occupying less than the total volume of each cell.

4. The material of claim 1 wherein the cellular material has a small amount of a gas sealed therein at a predetermined pressure in admixture with the vaporizing material, the gas being inert with respect to the vaporizing substance and preventing complete deflation of the cellular material under normal atmospheric conditions.

5. A constant pressure, self-inflating, flexible pressure suit suitable for use in low or zero exterior environments comprising a flexible, porous inner garment adapted to fit the outer contour of the body of a wearer in slack condition, an outer porous, flexible, substantially nonextensible garment surrounding the inner garment, and an intermediate, resilient, multi-cellular material made up of independent cells with a vaporizing substance sealed therein, the vaporizing substance occupying less than the maximum inflated volume of each cell and having a vapor pressure equal to predetermined inflation pressure at a given temperature, the vaporizing substance, by phase change from solid or liquid to gas, maintaining the inflation pressure against the cell walls and the outer surface of the body of the wearer when the external pressure conditions are less than the inflation pressure and independent of change in the volume of the cells due to body movement of the wearer or otherwise.

6. The pressure suit of claim 5 wherein the cells of the multi-cellular material are held together by a flexible, substantially non-extensible material.

7. The pressure suit of claim 5 wherein the cells of the multi-cellular material contain a subliming solid occupying less than the total volume of each cell.

8. The pressure suit of claim 5 wherein the cells of the multi-cellular material contain an evaporating liquid occupying less than the total volume of each cell.

9. The pressure suit of claim 5 wherein the vaporizing substance is one selected from the group consisting of ammonium carbonate, tetrahydropentaborene, carbon tetrachloride, chloride heptoxide, trisilane, and ethyl alcohol.

10. The material of claim 5 wherein the cellular material has a small amount of a gas sealed therein at a predetermined pressure in admixture with the vaporizing material, the gas being inert with respect to the vaporizing substance and preventing complete deflation of the cellular material under normal atmospheric conditions.

* * * * *